(12) United States Patent
Paulson, Jr. et al.

(10) Patent No.: US 6,253,535 B1
(45) Date of Patent: Jul. 3, 2001

(54) FINGER ROLLERS FOR AGRICULTURAL IMPLEMENTS

(75) Inventors: William Walter Paulson, Jr., Pine City, MN (US); Sebastian Jäger, Hannover (DE)

(73) Assignee: Artemis Kautschuk- und Kunststofftechnik GmbH & Cie (DE)

(*) Notice: Subject to any disclaimer, the term of this patent is extended or adjusted under 35 U.S.C. 154(b) by 0 days.

(21) Appl. No.: 09/439,703

(22) Filed: Nov. 12, 1999

(51) Int. Cl.$^7$ ................................................ A01D 45/00
(52) U.S. Cl. ............................................ 56/327.1; 172/55
(58) Field of Search ............................ 56/327.1, 327.2, 56/255, 295, DIG. 20; 172/49, 51, 55, 48, 68, 123

(56) References Cited

U.S. PATENT DOCUMENTS

| | | | |
|---|---|---|---|
| 3,705,628 | * 12/1972 | King | 172/68 |
| 4,446,678 | * 5/1984 | Smith | 56/1 |
| 4,578,937 | * 4/1986 | West et al. | 56/130 |
| 4,821,655 | * 4/1989 | Rizzo | 111/8 |
| 5,010,717 | * 4/1991 | Nakamura et al. | 56/17.6 |
| 5,161,356 | * 11/1992 | Pick | 56/60 |
| 5,236,050 | * 8/1993 | Dairon | 172/103 |
| 5,673,861 | * 10/1997 | Miller | 241/69 |
| 5,745,947 | * 5/1998 | Liu et al. | 15/84 |
| 5,787,696 | * 8/1998 | Wiegert et al. | 56/104 |

* cited by examiner

Primary Examiner—Thomas B. Will
Assistant Examiner—Árpád F Kovács
(74) Attorney, Agent, or Firm—Robert W. Becker & Associates

(57) ABSTRACT

A finger roller for an agricultural implement has a shaft with a non-circular cross-section. Two or more finger disks are pushed onto the shaft in the axial direction of the shaft. The finger disks each have a hub with a central opening having an inner contour configured to match the cross-section of the shaft. The finger disks each have elastically deformable fingers connected to the hub. The fingers of each one of the finger disks are distributed uniformly about a circumference of the hub and project away from the hub. The shaft has a circumferential surface comprised of identical circumferential portions sequentially arranged in the circumferential direction of the shaft. The finger disks each have an odd number of fingers when the circumferential portions are even numbered, and the fingers disks each have an even number of fingers when the circumferential portions are odd numbered.

14 Claims, 1 Drawing Sheet

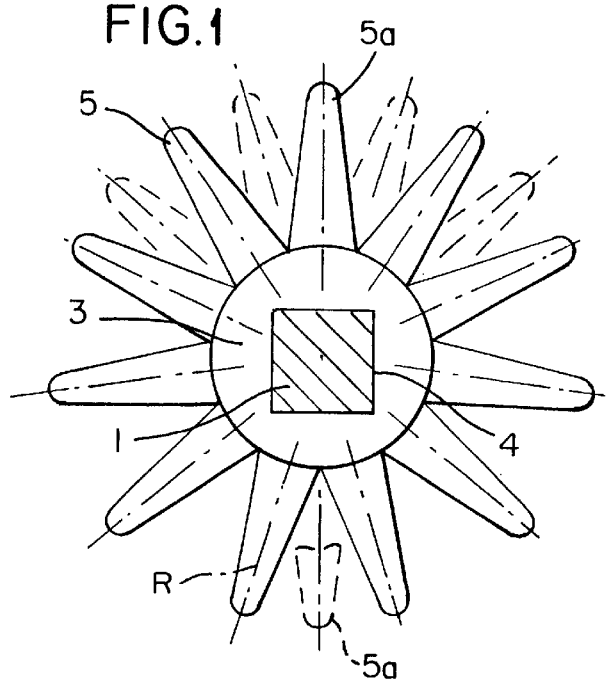
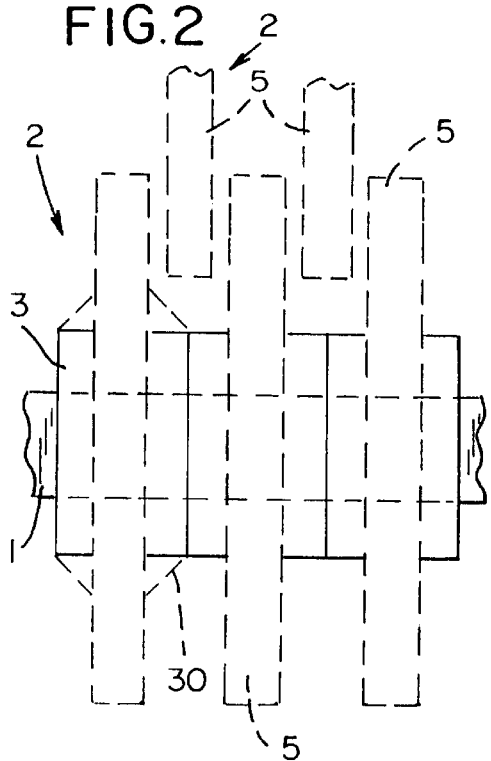
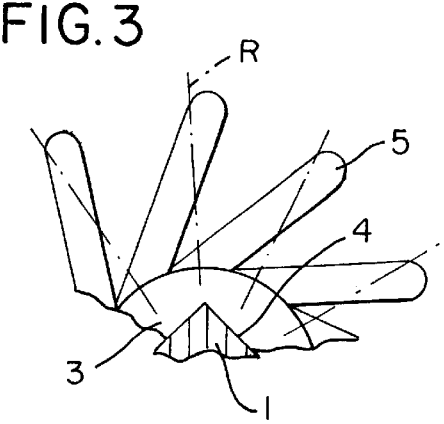
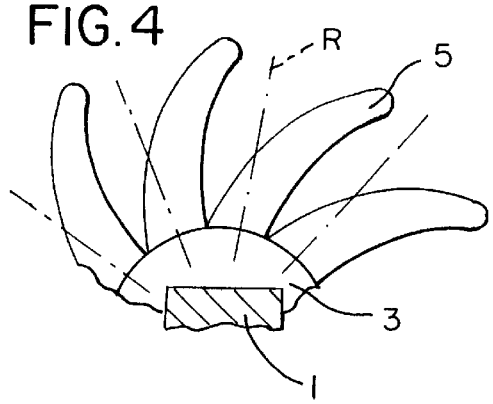
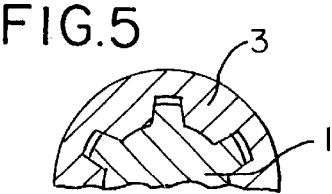
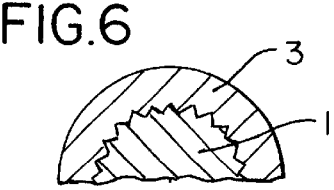

FINGER ROLLERS FOR AGRICULTURAL IMPLEMENTS

BACKGROUND OF THE INVENTION

The invention relates to a finger roller for agricultural implements, wherein the roller is comprised of two or more finger disks pushed onto a shaft that rotates the roller. The finger disks have a hub which surrounds the shaft and a plurality of slightly elastically deformable fingers arranged about the circumference of the hub and projecting from the hub.

Such rollers are, for example, used for potato harvesters, beet harvesters, rock removers, and vegetable harvesting machines. In principle, they have the object to clean, sort, and screen the tubers or beets or, optionally, to remove soil adhering to the tubers, beets, or the removed rocks.

For manufacturing such a finger roller, individual finger disks are used which are produced by molding and are placed sequentially onto the shaft having a non-circular cross-section. The non-circular cross-section is provided in order to ensure that the finger disks follow the rotation of the shaft. It is often desirable to rotate the fingers of neighboring finger disks relative to one another in the circumferential direction of the drive shaft in order to thereby increase the cleaning effect. In order to achieve this goal, differently shaped finger disks must be used which results, of course, in an increased expenditure for manufacture as well as storage.

It is therefore an object of the present invention to avoid these disadvantages. The invention has the goal to eliminate the aforementioned differently shaped finger disks and to provide instead a finger roller still having the aforementioned finger staggering in the circumferential direction but employing finger disks of identical design.

SUMMARY OF THE INVENTION

As a solution to this object it is suggested that the surface of the shaft is provided with a plurality of circumferential portions of identical design, wherein for an even number of such circumferential portions an uneven number of fingers is provided at the finger disks and wherein for an uneven number of circumferential portions an even number of fingers at the fingers disks is provided.

With such a configuration of the finger disks, it is possible to provide aligned (non-staggered) fingers at neighboring finger disks but also to provide staggered fingers by rotating neighboring finger disks relative to one another when placing them onto the shaft.

This effect can be easily realized with a so-called square shaft having finger disks mounted thereon with three, five, seven, nine, eleven, thirteen, or more fingers (i.e., the number of fingers is uneven).

BRIEF DESCRIPTION OF THE DRAWINGS

The object and advantages of the present invention will appear more clearly from the following specification in conjunction with the accompanying drawings, in which:

FIG. 1 shows a finger roller for agricultural implements in cross-section;

FIG. 2 shows the roller of FIG. 1 in a partial side view;

FIGS. 3 and 4 show part cross-sectional views of differently configured finger rollers; and FIGS. 5 and 6 show part cross-sectional views of the finger roller with different fastening configurations of the finger disks on the shaft.

DESCRIPTION OF PREFERRED EMBODIMENTS

The present invention will now be described in detail with the aid of several specific embodiments utilizing FIGS. 1 through 6.

The inventive finger roller comprises a rotating shaft 1 and wheel-like finger disks 2 mounted thereon. Each finger disk 2 has a hub 3 having a central opening 4 with a contour matching the cross-section of the shaft 1. Fingers 5 are fastened to the hub 3. They are at least slightly elastically deformable and project from the hub 3. The finger disks 2 are produced as shaped bodies by injection molding of polymer material, for example, rubber, polyurethane, elastomer, or thermoplastic material.

In the embodiment according to FIGS. 1 and 2, the fingers 5 have a radial position. In the shown embodiment of FIGS. 1 and 2, eleven fingers 5 uniformly spaced about the circumference are provided. In this embodiment, as well as in the embodiment according to FIGS. 3 and 4, the shaft 1 is square as is the penetration or central opening 4 of the hub 3. The inventive finger roller is usually employed in connection with a continuous rod screen conveyor arranged upstream or downstream thereof. The finger roller is made by producing multiple finger disks 2 of identical configuration that are then threaded onto the shaft 1 so that in the end they are tightly positioned adjacent to one another, as shown in FIG. 2. The penetrations or central openings 4 have such tight tolerances that no play is present between the hub 3 and the shaft 1 when the finger disk 2 is positioned on the shaft 1.

In order to provide a staggering of the fingers 5 of neighboring finger disks 2, the first finger disk 2 is positioned onto the shaft with the finger 5a pointing in the upward direction and, subsequently, the second finger disk 2 with the finger 5a pointing in the downward direction is placed onto the shaft 2. The arrangement of a certain finger 5a thus takes place alternatingly in one direction and the arrangement of the subsequently positioned finger disk 2 with the finger 5a is carried out so that the finger 5a of the second disk points into the opposite (diametrically opposed) position. Accordingly, for adjacently positioned finger disks 2 the finger arrangement as shown in FIG. 1 results. The fingers 5 shown in dashed lines are staggered and arranged centrally between the fingers 5 of the neighboring finger disks 2, i.e., they are positioned in the gap between fingers of the neighboring finger disk 2.

In the embodiment according to FIG. 1 the next finger disk 2 is rotated by 180° upon mounting in order to realize the arrangement in the gap between the fingers of the previously mounted finger disk 2. When the subsequent finger disk 2 is rotated only by 90°, a staggering of the fingers 5 will also be achieved. This results in an asymmetric arrangement which may also be beneficial. Furthermore, two or more finger disks 2 can be mounted so as to have aligned fingers 5 whereby a group of finger disks 2 with aligned fingers 5 is then positioned such that its position deviates from that of the finger disks 2 of another group.

It should be noted that a single finger disk configuration is sufficient to provide the desired displacement or staggering.

It is understood that two or more finger rollers with usually parallel shafts 1 can be combined to form a table wherein, according to FIG. 2 (top), the fingers 5 of the neighboring finger rollers will mesh with one another.

In the embodiment according to FIGS. 3 and 4, eleven fingers 5 uniformly distributed about the circumference are provided at the hub 3. However, according to FIG. 3, the fingers extend tangentially relative to the hub 3 while the fingers according to FIG. 4 extend arc-shaped. The base of each finger 5 at the hub 3 is positioned according to a circumferential division which is defined by radial lines R. In the case of, for example, eleven fingers 5 and a corresponding division of the hub by eleven radials R, a match is achieved, and the finger disks 2 can be combined as desired, for example, according to the arrangements of FIGS. 1 through 3.

Of course, in the context of the present invention, more or fewer fingers can be arranged on the hub 3 in comparison to the configuration disclosed above.

Even though a so-called square shaft 1 (FIGS. 1 through 4) is especially advantageous and simple, it is also possible to provide differently designed shafts 1 and correspondingly shaped central openings 4 at the hub 3. According to FIG. 5, between hub 3 and shaft 1 a connection based on a toothed or splined shaft is provided. According to FIG. 6 a connection based on a channel toothing is provided. These connections are comparatively more complex, but they provide a more precise staggering and displacement, respectively, a finer stepping between the finger disks. Preferably, the outer contour of the shaft 1 should be a polygon, especially a square. When the shaft is of a square cross-section, eleven or thirteen fingers at the respective finger disks are especially beneficial.

It should be noted that the hub 3 of each finger disk preferably projects axially past the fingers and in a preferred embodiment a conical (in cross-section) transition 30 from the hub 3 to the fingers 5 is provided such that the greatest diameter of the conical cross-section is located at the fingers 5. This is shown in dashed lines in FIG. 2.

The present invention is, of course, in no way restricted to the specific disclosure of the specification and drawings, but also encompasses any modifications within the scope of the appended claims.

What is claimed is:

1. A finger roller for an agricultural implement, said finger roller comprising:

a shaft (1) having a non-circular cross-section;

two or more finger disks (2) pushed onto said shaft (1) in an axial direction of said shaft (1), said finger disks (2) being of identical design;

said finger disks (2) each having a hub (3) with a central opening (4) having an inner contour configured to match said cross-section of said shaft (1);

said finger disks (2) each having elastically deformable fingers (5) connected to said hub (3);

said fingers (5) of each one of said finger disks (2) distributed uniformly about a circumference of said hub (3) and projecting away from said hub (3);

said shaft (1) having a circumferential surface comprised of identical circumferential portions sequentially arranged in a circumferential direction of said shaft (1);

said finger disks (2) positioned on said shaft such that the fingers (5) of each finger disk (2) are aligned with the fingers (5) of a neighboring finger disk (2);

wherein said finger disks (2) each have an odd number of said fingers (5) when said circumferential portions are even numbered and wherein said finger disks (2) each have an even number of said fingers (5) when said circumferential portions are odd numbered.

2. A finger roller according to claim 1, wherein said cross-section of said shaft (1) is square so that four of said circumferential portions are provided.

3. A finger roller according to claim 1, wherein each one of said finger disks (2) has three to 17 fingers (5).

4. A finger roller according to claim 1, wherein said finger disks (2) are positioned on said shaft (1) such that said finger disks (2) are rotated in a sequence of placement onto said shaft (1) relative to a previously placed one of said finger disks (1) such that said fingers (5) of said previously placed one of said finger disks (2) are positioned between said fingers (5) of an adjacent following one of said finger disks (2), when viewing finger roller in an end view onto said shaft (1).

5. A finger roller according to claim 1, wherein said fingers (5) of each one of said finger disks (2) extend substantially radially.

6. A finger roller according to claim 1, wherein said fingers (5) of each one of said finger disks (2) extend substantially tangentially away from said hub (3).

7. A finger roller according to claim 1, wherein said fingers (5) of each one of said finger disks (2) are arc-shaped.

8. A finger roller according to claim 1, wherein said hub (3) of each one of said finger disks (2) has a greater axial width than said fingers (5) and projects axially past said fingers (5) on both sides of said fingers (5).

9. A finger roller according to claim 1, wherein said hub (3) has a circumferential portion that is conical when viewed in an axial cross-section, wherein said conical circumferential portion forms a transition between said hub (3) and said fingers (5).

10. A finger roller according to claim 1, wherein neighboring ones of said finger disks (2) are rotated by 180° relative to one another.

11. A finger roller according to claim 1, wherein those ones of said finger disks (2) having an identical number of fingers (5) are grouped together and arranged such that said fingers (5) of said finger disks (2) are aligned with one another.

12. A finger roller according to claim 1, wherein said finger disks (2) are arranged such that said fingers (5) are aligned when viewed in said axial direction of said shaft (1).

13. A finger roller according to claim 1, wherein said cross-section of said shaft (1) is polygonal and wherein said circumferential portions are defined by the sides of said polygonal cross-section.

14. A finger roller according to claim 1, wherein said finger disks (2) have 11 of said fingers (5) or 13 of said fingers (5).

* * * * *